No. 704,811. Patented July 15, 1902.
L. F. ANDERSON.
TROUSERS FORMER.
(Application filed Oct. 29, 1901.)
(No Model.) 2 Sheets—Sheet 1.
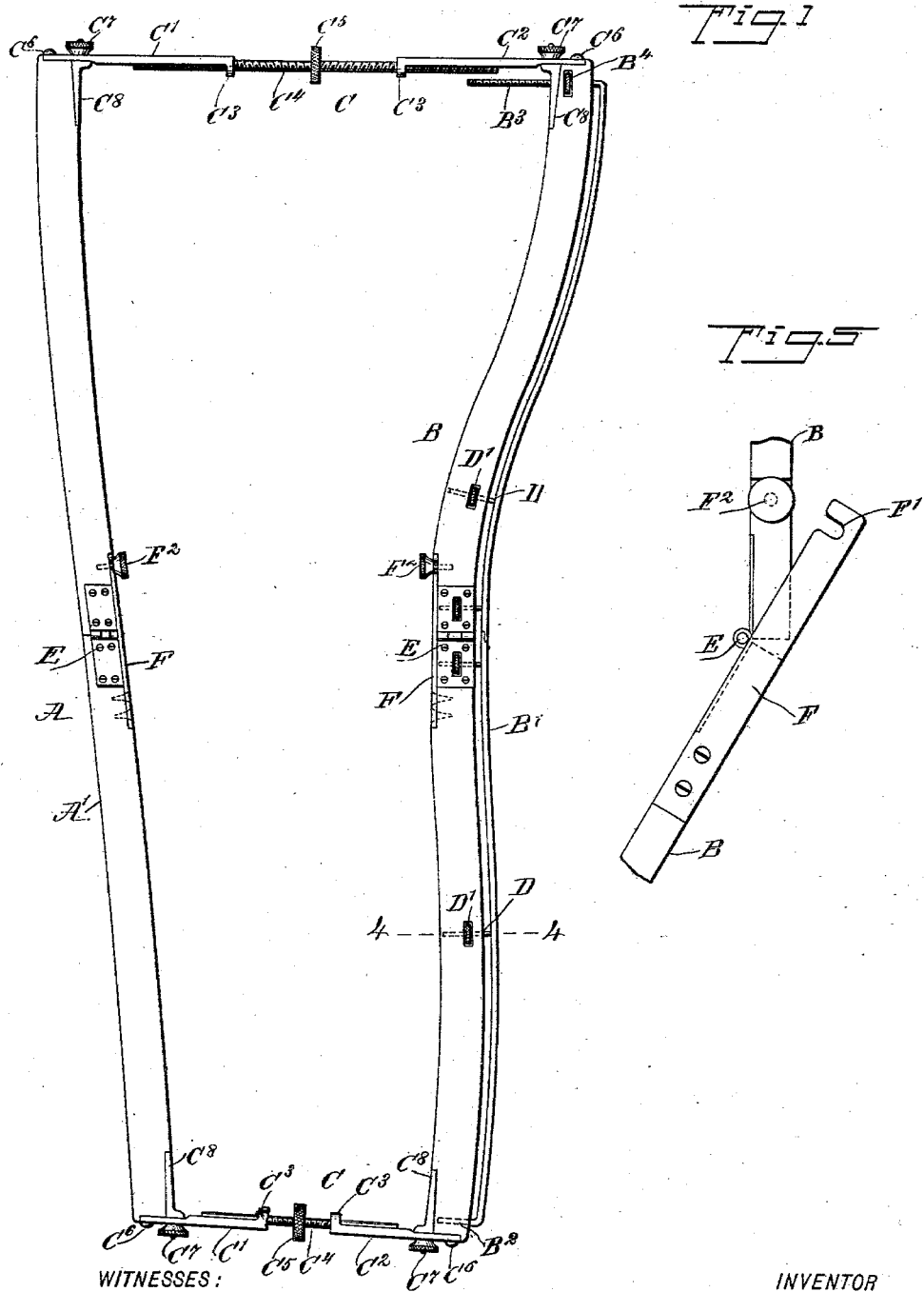
WITNESSES:
INVENTOR
Louis F. Anderson
BY
ATTORNEYS

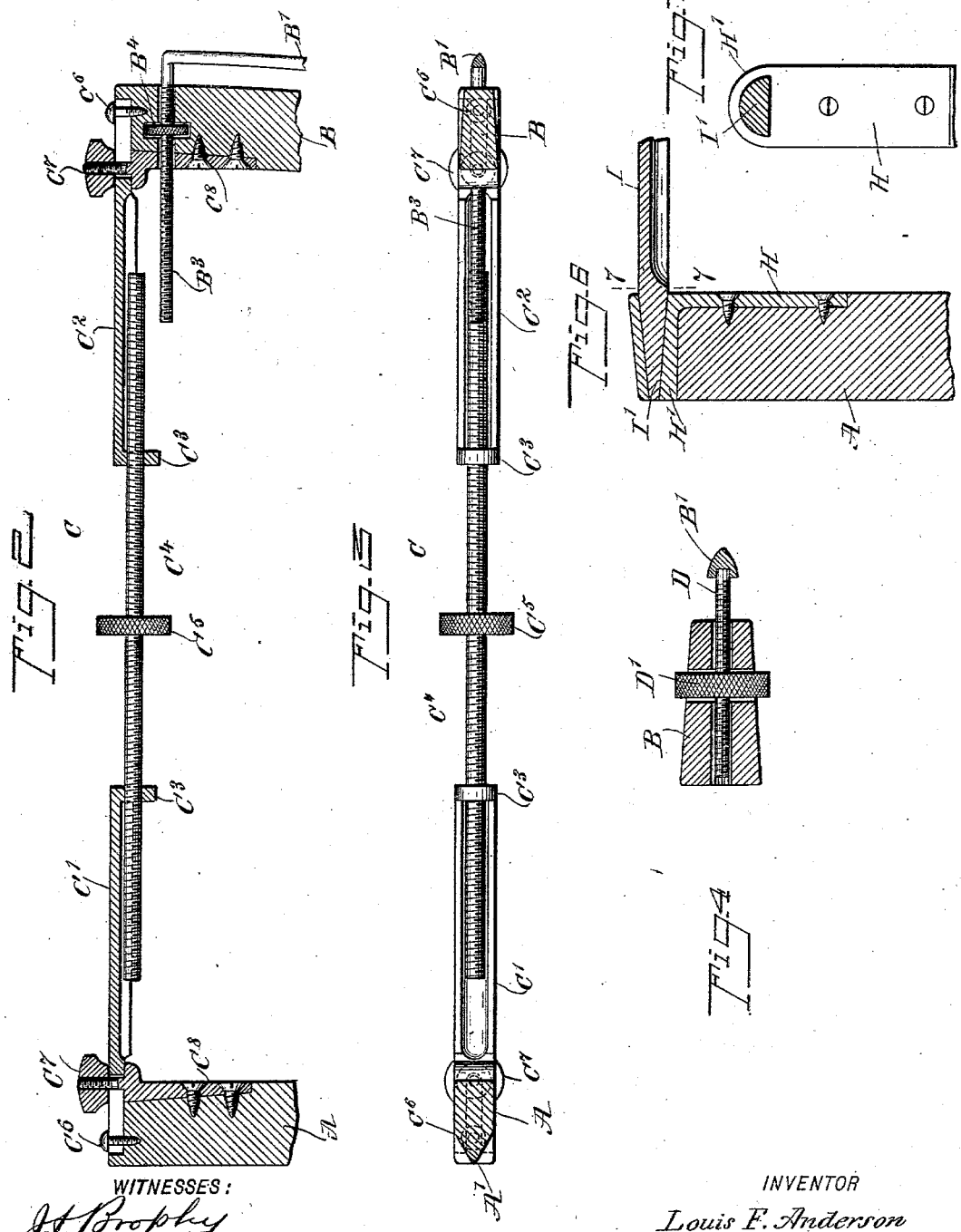

UNITED STATES PATENT OFFICE.

LOUIS F. ANDERSON, OF QUINCY, ILLINOIS.

TROUSERS-FORMER.

SPECIFICATION forming part of Letters Patent No. 704,811, dated July 15, 1902.

Application filed October 29, 1901. Serial No. 80,422. (No model.)

*To all whom it may concern:*

Be it known that I, LOUIS F. ANDERSON, a citizen of the United States, and a resident of Quincy, in the county of Adams and State of Illinois, have invented a new and Improved Trousers-Shaper, of which the following is a full, clear, and exact description.

The object of the invention is to provide a new and improved trousers-shaper which is simple and durable in construction, adapted to be folded into a comparatively small space when not in use, and arranged to shape and smooth either new or bagged and wrinkled trousers.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement. Fig. 2 is an enlarged sectional side elevation of the outer end of the improvement. Fig. 3 is an inverted sectional plan view of the same. Fig. 4 is an enlarged sectional plan view of the rear shank, the section being on the line 4 4 of Fig. 1. Fig. 5 is an enlarged view of the locking device for the sectional shanks. Fig. 6 is an enlarged sectional side elevation of a modified form of the improvement, and Fig. 7 is a cross-section of the same on the line 7 7 of Fig. 6.

The improved trousers-shaper consists, essentially, of a front shank A, a rear shank B, and an adjustable connection C for adjustably connecting the upper and lower ends of the front and rear shanks with each other. The outer side $A'$ of the front shank A is made V-shaped to firmly engage a trousers-leg at the inside thereof at the front portion to give the desired crease to the front of the trousers-leg. The rear shank B is provided with a bar $B'$, preferably made triangular in cross-section, as indicated in Fig. 4, and extending a distance from the outer side of the shank B to engage the inside of the trousers-leg at the rear portion to form the desired crease therein. The shanks A and B are shaped approximately to the curvature given to the trousers-leg at the front and rear portions thereof, and when the device is inserted in a trousers-leg and the connecting devices C are adjusted to cause the side $A'$ and the bar $B'$ to firmly engage the trousers at the front and rear portions the proper shape is given to the trousers-leg and at the same time the desired creases are obtained. The bar $B'$ has its lower end formed with an angular pin $B^2$, engaging the lower end of the shank B, and the upper end of the said bar $B'$ is formed with an angular screw-rod $B^3$, extending through an opening in the shank B and engaged by a nut $B^4$, fitted in a recess in the upper end of the shank B, so as to be held against outward or inward movement. By the operator turning the nut $B^4$ the screw-rod $B^3$ is caused to move inward or outward, according to the direction in which the nut is turned, so as to adjust the bar $B'$ relative to the outer side of the shank B. The desired curvature can be given to the bar $B'$ by the use of a plurality of screw-rods D, adapted to abut against the inner side of the bar and to be held loosely in the shank B, each screw-rod being engaged by a nut $D'$, held in an aperture in the shank B.

Each of the connections C consists of brackets $C'$ and $C^2$, extending toward each other and removably secured to the upper ends of the shanks A and B, and the inner ends of the said brackets $C'$ and $C^2$ are formed with nuts $C^3$, in which screw the right and left hand threaded parts of a screw-rod $C^4$, provided at its middle with a head $C^5$, adapted to be turned by the operator to turn the screw-rod $C^4$ so as to move the brackets $C'$ and $C^2$ simultaneously toward or from each other to shift the shanks A and B correspondingly, according to the size of the trousers-leg on which the device is to be used. Each of the brackets $C'$ and $C^2$ is forked at its outer end to engage a fixed screw-rod $C^6$ and a clamping-screw $C^7$, held on a keeper $C^8$, attached to the corresponding shank A or B.

The shanks A and B may be made in sections connected with each other by hinges E to allow of folding the shanks into a comparatively small space when the device is not in use. In order to hold the shank-sections locked in an extended position, I provide an arm F, secured to one of the shank-sections and having a notch F', adapted to be engaged by a clamping-screw F², held on the adjacent shank-section. (See Figs. 1 and 5.)

The brackets on the shanks A and B may be made in the form shown in Figs. 6 and 7, in which the keeper H is secured to the end of the shank and is formed with a socket H', adapted to receive a correspondingly-shaped pin I' on the bracket I, the bottom portions of the keeper socket and pin being flattened to prevent the bracket from turning.

I do not limit myself to the particular adjustable connection used at the ends of the shanks A and B, as the said connection may be varied without deviating from my invention, and the shanks A and B may each be made in one piece instead of in sections, as above explained.

Having thus described my invention, I claim as new and desire to secure by Letters Patent—

1. A trousers-shaper for insertion into a trousers-leg, comprising a front shank having a V-shaped outer side for engaging the front of the trousers-leg, a rear shank provided with an adjustable bar having a V-shaped outer side for engaging the rear of the trousers-leg, and means for adjustably connecting the shanks with each other to move the front shank and the bar of the rear shank firmly in engagement with the trousers-leg, as set forth.

2. A trousers-shaper for insertion into a trousers-leg, comprising a front shank having its outer side V-shaped to firmly engage the front of the trousers-leg, a rear shank, a crease-bar movably mounted on the rear shank and adapted to engage the rear of the trousers-leg, means for adjusting the crease-bar, to and from the shank and holding it in the adjusted position, and means for connecting the shanks with each other, as set forth.

3. A trousers-shaper for insertion in a trousers-leg, comprising a front shank for engaging the front of the trousers-leg, a rear shank for engaging the rear of the trousers-leg, and means for adjustably connecting the ends of the shanks with each other, each of the said means comprising brackets detachably and adjustably secured to the ends of the shanks to extend inwardly toward each other and each provided with a nut at its end, and a right and left hand screw-rod working in the nuts of the brackets, as set forth.

4. In a trousers-shaper, the combination with shanks adjustably connected together of a crease-bar movably mounted on one of the shanks, and means for adjusting the crease-bar toward and from the shank and holding it in the adjusted position, as set forth.

5. A trousers-shaper, comprising a front shank made in sections adapted to be folded, a rear shank made in sections and adapted to be folded, a crease-bar adjustably secured to the rear shank, means for adjustably connecting the shanks with each other and comprising removable brackets on the ends of the shanks, and a right and left hand screw-rod for engaging each pair of brackets at each end of the device, as set forth.

6. In a trousers-shaper, the combination with two members adjustably connected together, of a crease-bar having its ends engaging the rear member, and screws carried by the rear member intermediate of its ends and engaging the said bar, as set forth.

7. In a trousers-stretcher, the combination with two members adjustably connected together, of a crease-bar having one end loosely engaging the rear member and its other end adjustably secured to the said member, and means carried by said member intermediate of its ends for engaging said bar, as set forth.

8. In a trousers-shaper, the combination with two members adjustably connected together, of a crease-bar having a pin at one end loosely engaging the rear member and provided at its other end with a screw-rod working in an opening in the rear member, and engaged by a nut in said rear member, a plurality of screw-rods mounted in the rear member intermediate of its ends and engaging the said bar, and nuts in the member for adjusting said screw-rods, as set forth.

9. A trousers-shaper, comprising a front and rear shank, each formed of hinged sections, the front shank having a V-shaped outer edge, means for adjustably connecting the ends of the shanks together, a crease-bar having a V-shaped outer edge and movably mounted on the rear shank, and means for adjusting the crease-bar toward and from the shank and holding it in the adjusted position, as set forth.

In testimony whereof I have signed my name to this specification in the presence of two subscribing witnesses.

LOUIS F. ANDERSON.

Witnesses:
AUGUST WILLIAM WERNER,
HEDWIG M. T. SCHMIDT.